United States Patent [19]

Sedlmayr

[11] Patent Number: 4,773,730
[45] Date of Patent: Sep. 27, 1988

[54] FIBER OPTIC LIGHT TRANSFER DEVICES AND ASSEMBLIES

[75] Inventor: Steven R. Sedlmayr, Golden, Colo.

[73] Assignee: Advance Display Technologies, Inc., Golden, Colo.

[21] Appl. No.: 25,385

[22] Filed: Mar. 12, 1987

Related U.S. Application Data

[63] Continuation-in-part of Ser. No. 575,816, Feb. 1, 1984, Pat. No. 4,650,280.

[51] Int. Cl.⁴ .................... G02B 6/08; F21V 7/04
[52] U.S. Cl. .................... 350/96.27; 350/96.10; 350/96.25; 350/96.28; 362/32; 358/901
[58] Field of Search ........... 350/96.10, 96.24, 96.25, 350/96.26, 96.27, 96.28, 320; 362/32; 358/901; 250/227; 264/1.1, 1.5, 2.5, 2.7

[56] References Cited

U.S. PATENT DOCUMENTS

| | | | |
|---|---|---|---|
| 3,043,910 | 7/1962 | Hicks, Jr. | 350/96.27 |
| 3,141,105 | 7/1964 | Courtney-Pratt | 350/96.24 |
| 3,644,922 | 2/1972 | James et al. | 350/96.24 |
| 3,907,403 | 9/1975 | Maeda | 350/96.27 |
| 3,950,074 | 4/1976 | Tanaka | 350/96.25 |
| 4,022,647 | 5/1977 | Yevick | 350/96.27 X |
| 4,116,739 | 9/1978 | Glenn | 350/96.25 |
| 4,173,391 | 11/1979 | Schure et al. | 350/96.25 |
| 4,208,096 | 6/1980 | Glenn, Jr. | 350/96.25 |
| 4,650,280 | 3/1987 | Sedlmayr | 350/96.27 |
| 4,690,500 | 9/1987 | Hayami et al. | 350/96.25 |

Primary Examiner—William L. Sikes
Assistant Examiner—Brian M. Healy
Attorney, Agent, or Firm—Fields, Lewis, Pittenger & Rost

[57] ABSTRACT

A fiber optic light transfer device has a plurality of optical fibers with first and second end surfaces. A locator body for the first end surface has parallel slots through which the fibers extend and by which the fibers are located and mechanically held against movement relative to one another in three mutually perpendicular planes. The locator body has ear projections along the back as well as a projection and socket for aligning and connecting two locator bodies side by side. The locator body has a series of ridges and grooves along opposite surfaces which enable them to be connected in a columnar arrangement. A separator is disposed between each ribbon for disposing the fibers forming the second end surface in substantially parallel planes. These separators and ribbons are integrally joined by glue to form a matrix body. The matrix body has a series of ridges and grooves which assist in aligning and connecting them side by side and end to end in an assembly. A channel-shaped locator element provides the ridges and grooves and mating surfaces for stacking the elements in a former and forms the locator body.

25 Claims, 9 Drawing Sheets

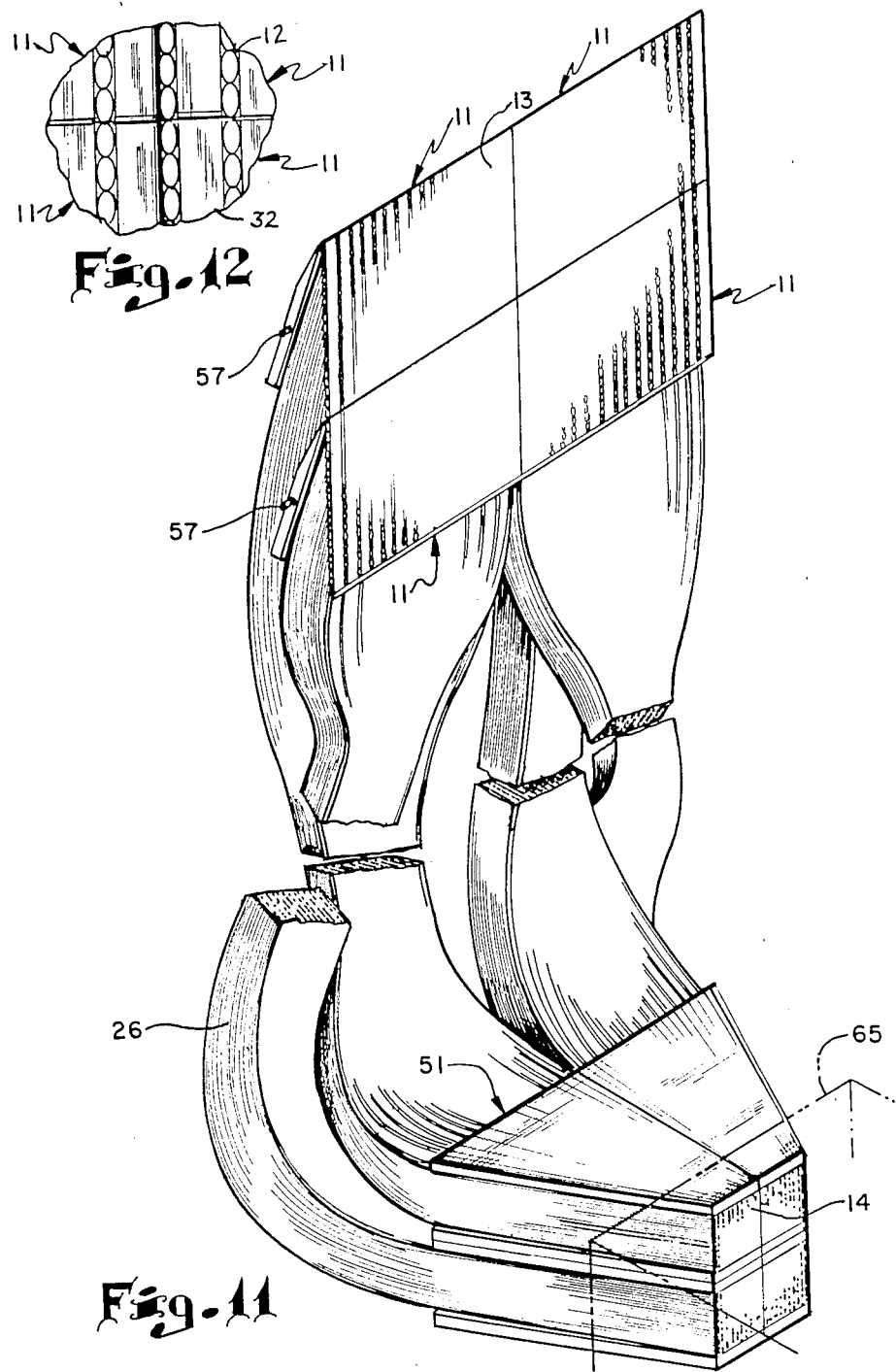

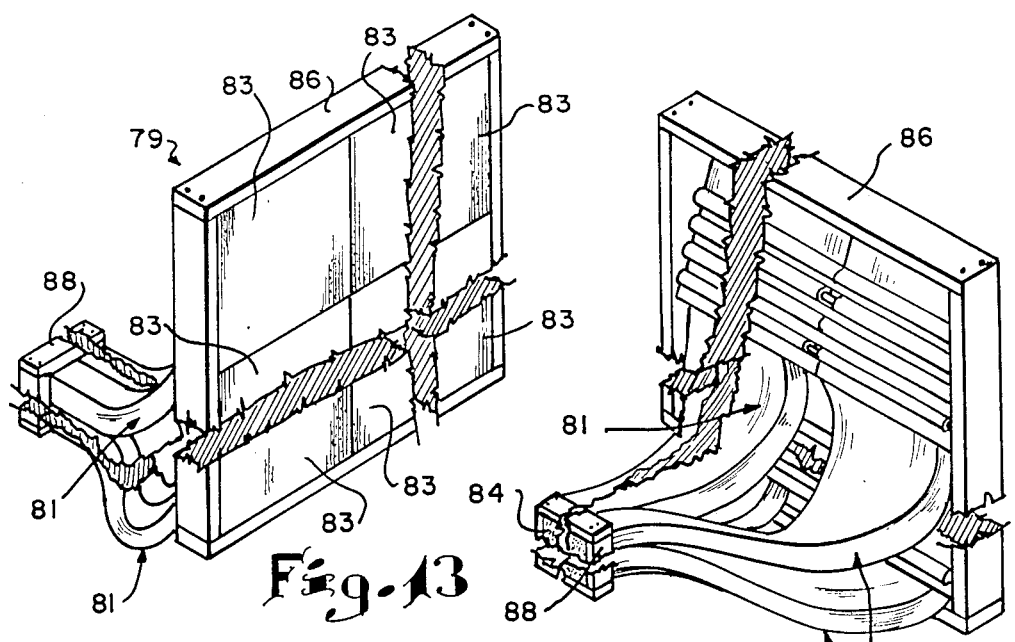
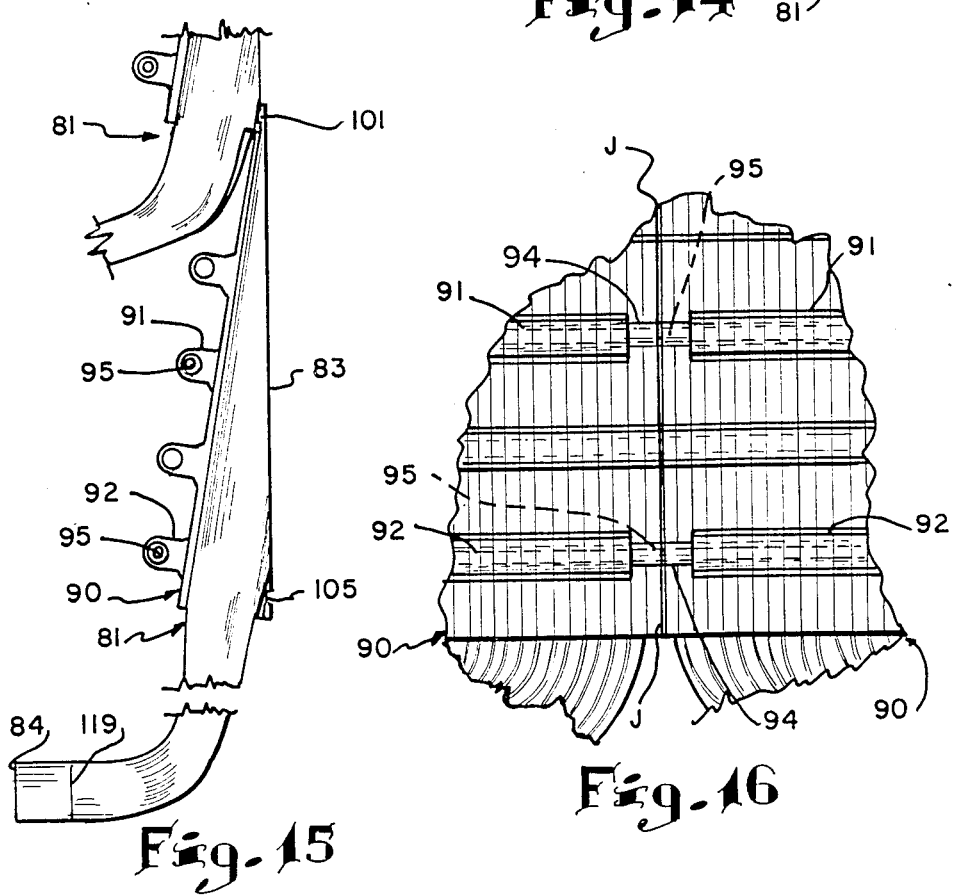

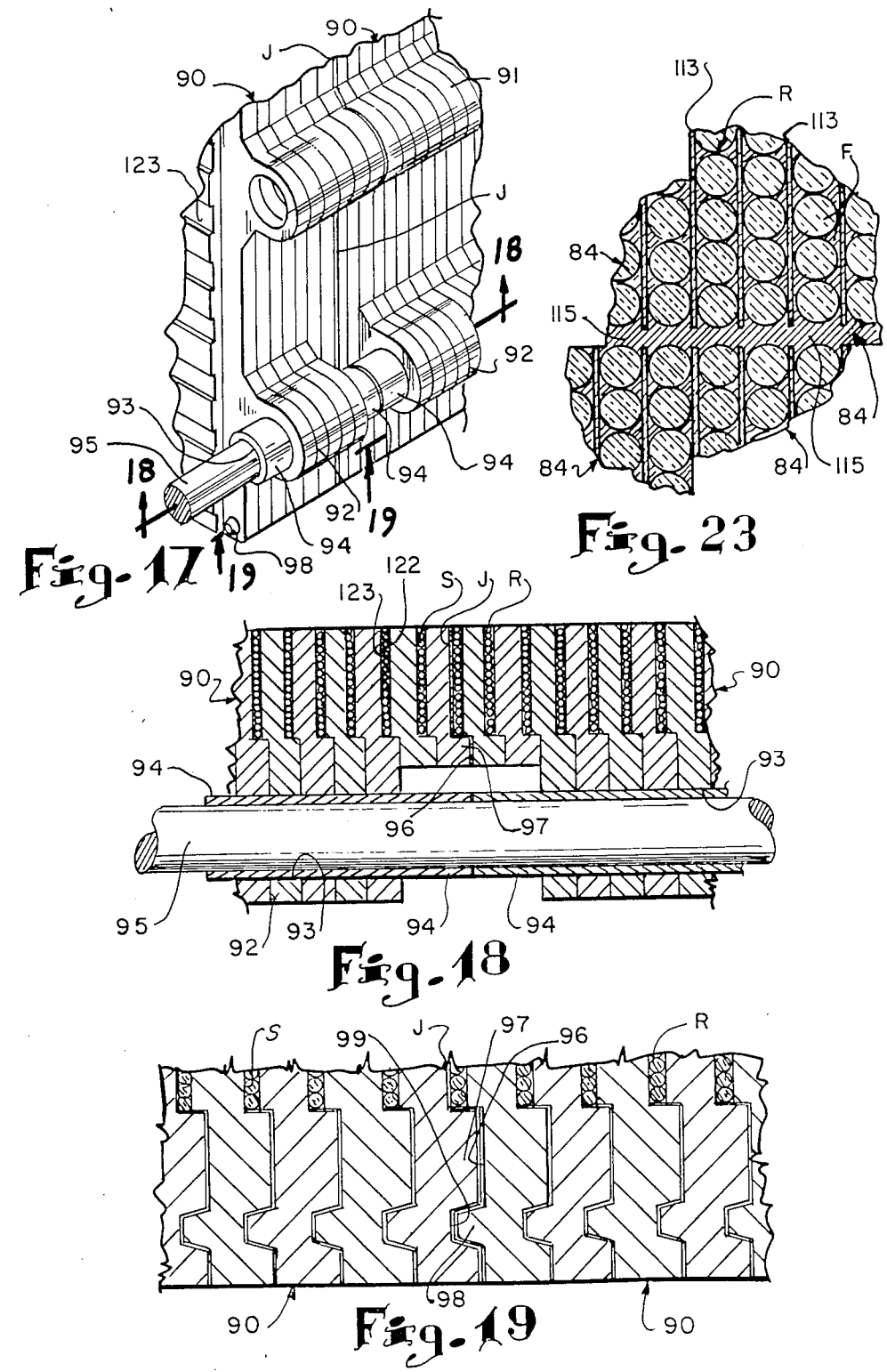

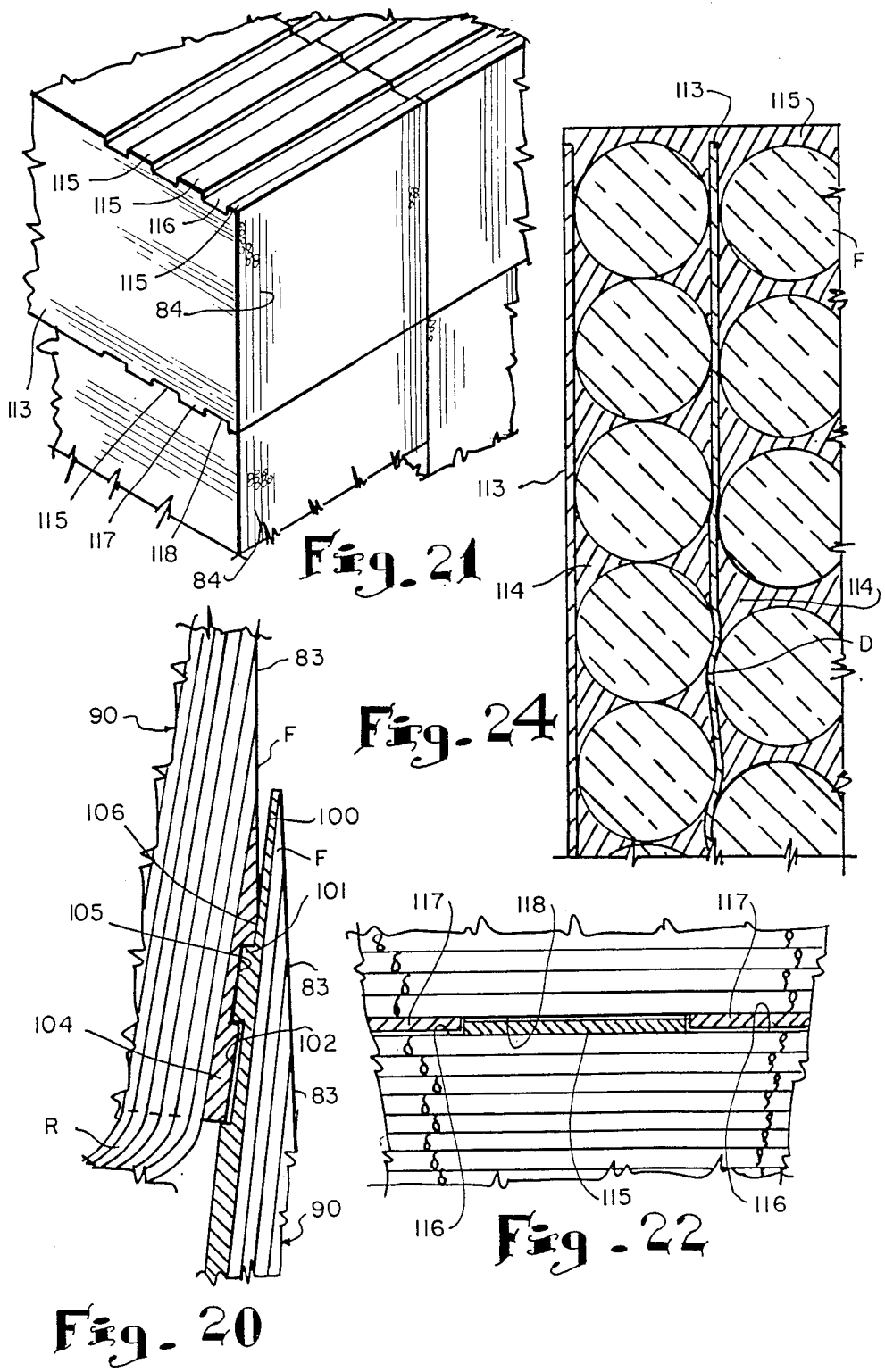

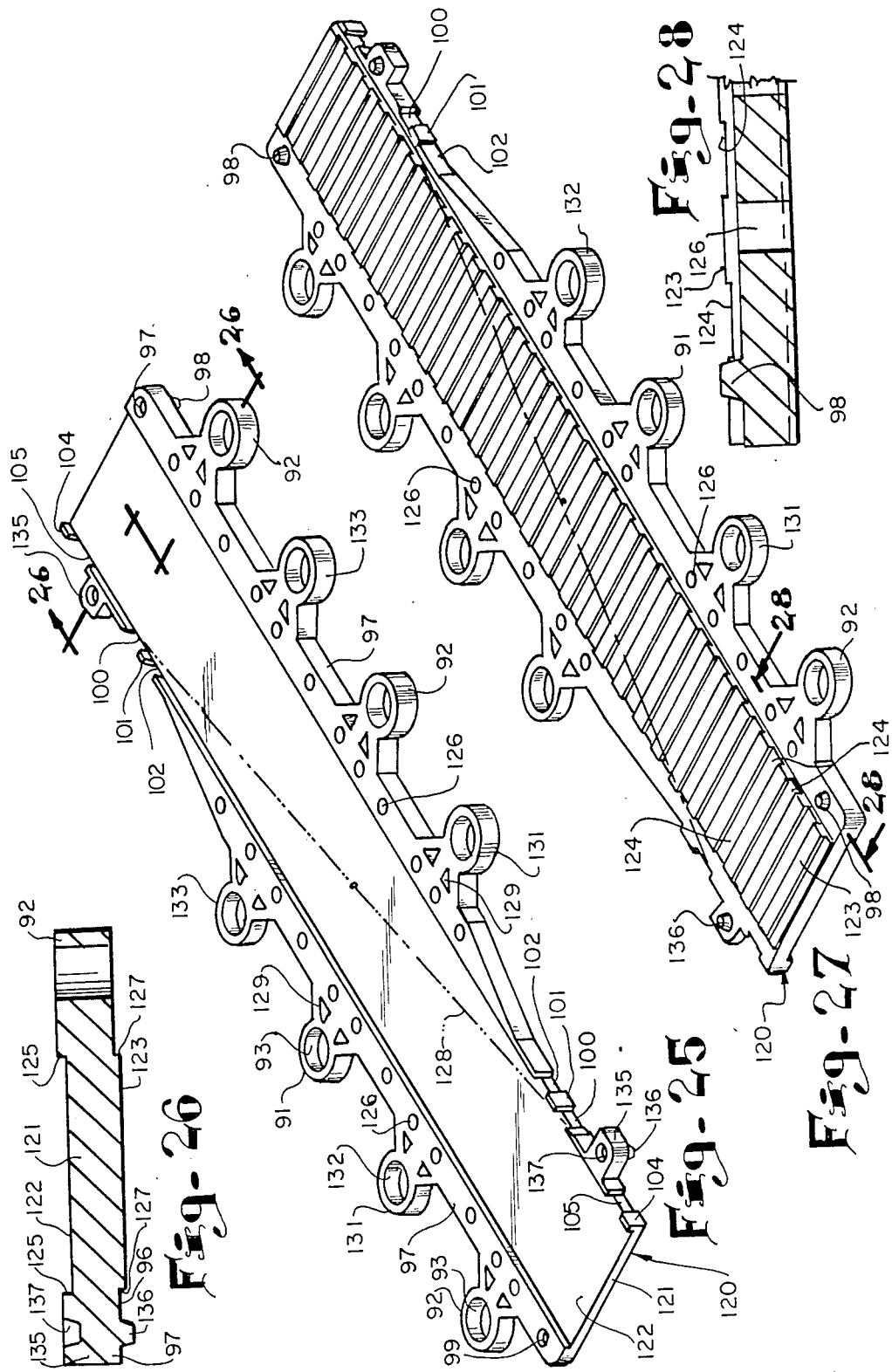

FIBER OPTIC LIGHT TRANSFER DEVICES AND ASSEMBLIES

This application is a continuation-in-part of application Ser. No. 575,816 filed Feb. 1, 1984 now U.S. Pat. No. 4,650,280.

TECHNICAL FIELD

This invention relates to novel and improved fiber optic light transfer apparatus.

BACKGROUND ART

The prior art fiber optical light or image transfer devices in general have been relatively complicated to manufacture, cumbersome, space consuming and economically prohibitive for widespread commercial use. The prior art has recognized the need for accurately locating and alining each fiber in an array but the relatively small size of each fiber and the brittleness thereof make this difficult.

Hicks U.S. Pat. No. 3,043,910 uses relatively thin flat spacer strips inclined at an angle to the lengthwise extent of the fibers and therefore lacks a disclosure for accurately locating and holding the fibers in precise location to one another in each of three planes that are perpendicular to one another. The particular problem that is not solved by Hicks is the tendency for one ribbon to skew, squirrel or twist relative to the other along the length of the fibers.

Glenn U.S. Pat. Nos. 4,116,739 and 4,208,096 attempt to solve the problem of accurate alinement and locating of the fibers in relation to one another by using a spirally wound construction. This approach, however, does not both accurately locate and hold the fibers in the three mutually perpendicular planes above discussed.

Further deficiency in the above discussed prior art is the lack of a satisfactory construction for expanding a basic light transfer unit to larger size units without sacrificing the resolution.

DISCLOSURE OF INVENTION

In accordance with the present invention there is provided a light transfer device for image transfer purposes and the like including an optical fiber locator body having a multiplicity of parallel internal slots. Each slot has first and second fiber supporting surfaces disposed in first and second mutually perpendicular planes, respectively. First and second supporting surfaces of a reference slot locate a reference end fiber that extends perpendicular to a third plane, which is perpendicular to the other two planes. The first and second supporting surfaces of further slots locate further end fibers at equally spaced intervals and in the first plane and locate further fiber ribbons in planes parallel to the reference second plane to precisely locate the fibers in relation to the reference fiber and, when adhered to the associated supporting surface, hold the fibers against relative movement in three planes that are perpendicular to one another. The located fibers are cut along a plane that is rotated 90 degrees to the reference plane and at a slight angle to the rotated plane to define an end surface of cut fiber ends. Preferably a locator body is provided at each end of the fibers to maintain the relative positions of each fiber in relation to one another. The method of making involves supporting intermediate portions of the fibers in a block with the slots or a block made up of a plurality of stacked channel-shaped locator members that is cut on a diagonal to form two identical light transfer devices that will stack side by side and end to end to form a modular assembly.

Another locator body disclosed has ear portions along the back as well as a projection and socket for aligning and connecting two locator bodies side by side in an assembly of multiple first end surfaces disposed side by side. The locator body has a series of ridges and grooves along opposite sides to facilitate aligned connection of an assembly of the devices in a columnar arrangement. A separator is disposed between each ribbon for disposing the fibers forming the smaller end surface in substantially parallel planes and the separators and ribbons are integrally joined using a reflective glue to form a matrix body. A plurality of locator elements made of polysulfone are stacked to provide the necessary slots, ridges and grooves and mating surfaces for two identical locator body portions which are ultimately cut into two parts.

BRIEF DESCRIPTION OF DRAWINGS

The details of this invention will be described in connection with the accompanying drawings, in which:

FIG. 11 is a modular assembly of four of the light transfer devices shown in FIG. 1;

FIG. 12 is a fragmentary plan view of the central portion of the modular assembly shown in FIG. 11;

FIG. 13 is a front perspective view of an alternative embodiment of an assembly of a plurality of light transfer devices;

FIG. 14 is a rear perspective view of the assembly shown in FIG. 13;

FIG. 15 is a side elevation view of two of the light transfer devices shown in FIG. 13 arranged one above the other;

FIG. 16 is an enlarged rear elevation view of portions of two devices connected side by side;

FIG. 17 is an enlarged rear perspective view of the structure shown in FIG. 16;

FIG. 18 is a sectional view taken along lines 18—18 of FIG. 17;

FIG. 19 is a sectional view taken along lines 19—19 of FIG. 17;

FIG. 20 is an enlarged side elevational view of the connection of two devices shown in FIG. 15;

FIG. 21 is an enlarged perspective view of the matrix end surfaces of the assembly shown in FIG. 13;

FIG. 22 is a sectional view taken along lines 22—22 of FIG. 21;

FIG. 23 is an enlarged end view of the central portion of the matrix end surfaces shown in FIG. 22;

FIG. 24 is yet a further enlarged view of the matrix end surface of one device shown in FIG. 23.

FIG. 25 is a top perspective view of a locator element;

FIG. 26 is a sectional view taken along lines 26—26 of FIG. 25;

FIG. 27 is a bottom perspective view of the element shown in FIG. 25;

FIG. 28 is a sectional view taken along lines 28—28 of FIG. 27.

DETAILED DESCRIPTION

Figure 1:
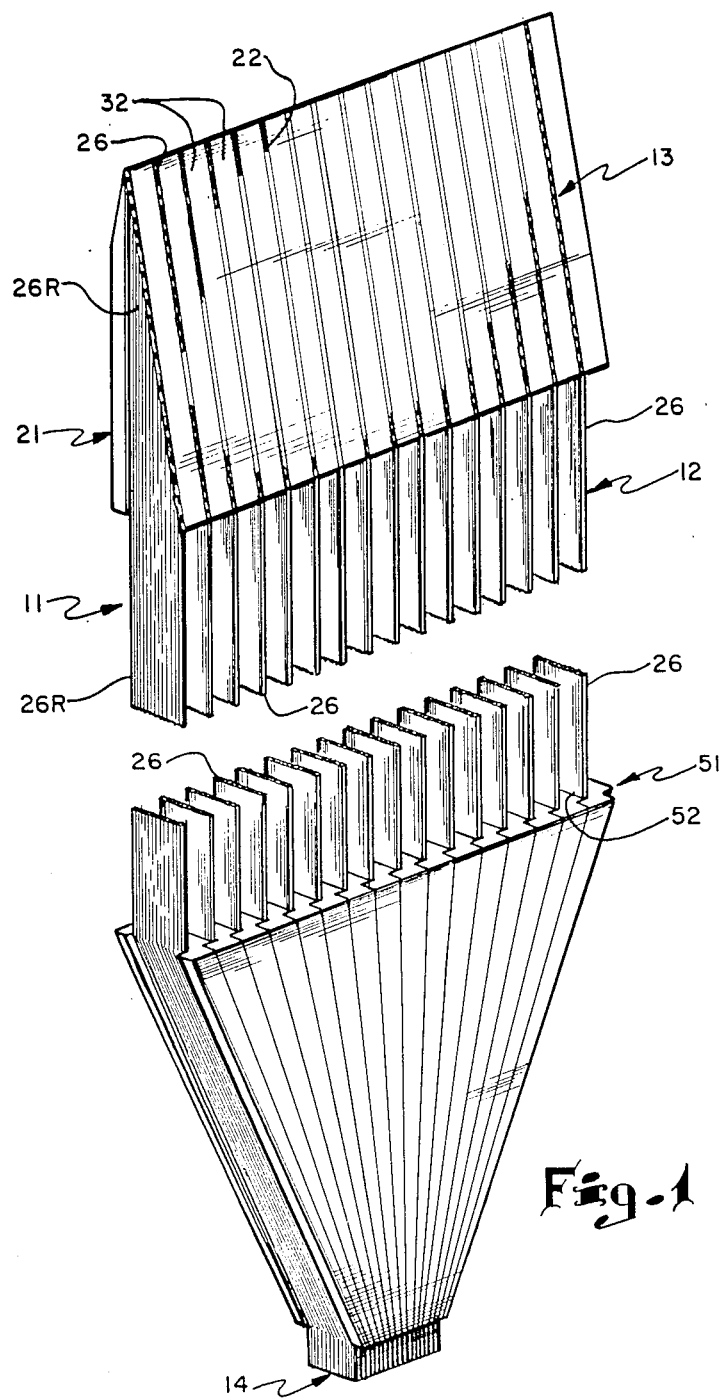
FIG. 1 is a perspective view of a light transfer device embodying features of the present invention.
Figure 2:
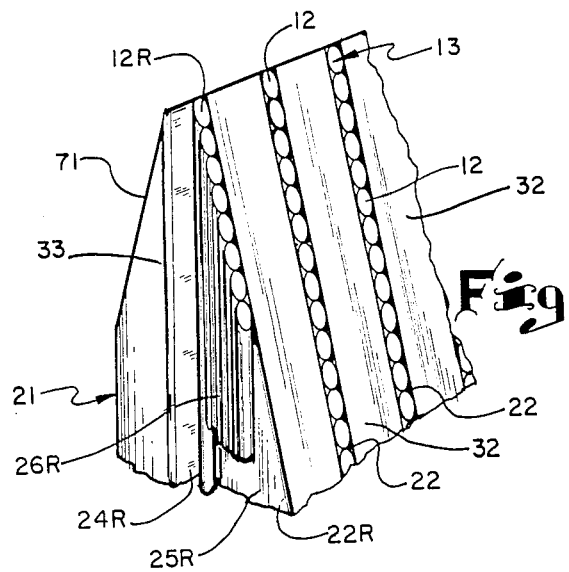
FIG. 2 is an enlarged perspective view of the upper left corner of the device shown in FIG. 2 with a portion of one fiber ribbon removed.

Referring now to FIG. 1, there is shown a light transfer device 11 according to the present invention including a plurality of optical fibers 12 forming an end surface 13 at one end and end surface 14 at the opposite end. In general, light will travel through light transfer device 11 and pass into either end surface in either direction (bi-directional) so that the end surfaces 13 and 14 are alternately a viewing surface or a light projecting surface.

The optical fibers 12 have adjacent end portions supported by a locator body 21. Body 21 is generally wedge-shaped and is formed with a multiplicity of interior parallel slots 22 extending therethrough with longitudinally facing openings at the ends, the slot to the far left as seen in FIG. 1 being open and the remaining slots being closed and all of the slots being of an identical size in transverse cross section.

The locator body 21, generally stated, has fiber supporting surfaces provided by slots 22 which precisely locate the optical fibers in relation to one another and, when adhered to these supporting surfaces, mechanically hold the fibers 12 in a fixed position relative to one another.

Figure 3:
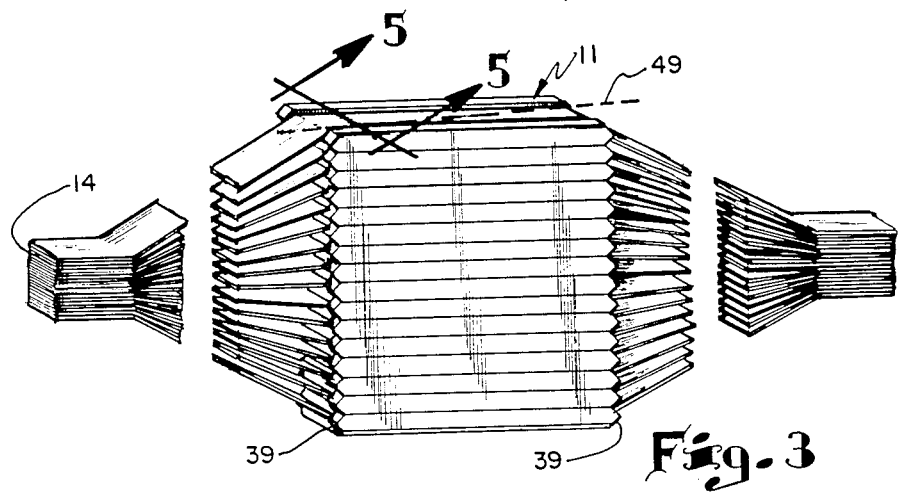
FIG. 3 is a perspective view illustrating a preferred method of making the device of FIG. 1 with the second locator members omitted.
Figure 4:
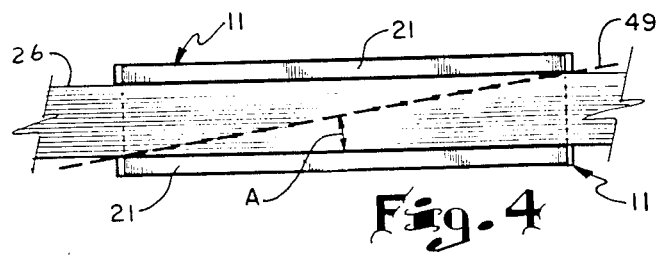
FIG. 4 is a top plan view of the assembly of FIG. 3.
Figure 5:
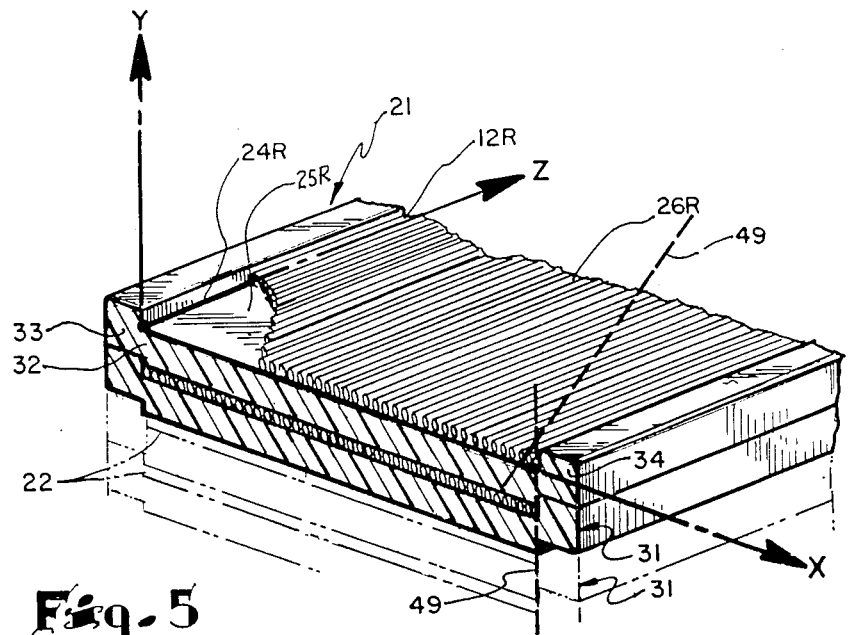
FIG. 5 is a sectional view taken along lines 5—5 of FIG. 3 with a portion of the fiber ribbon removed from the open slot.

For the purpose of further defining the fiber supporting surfaces and their positions relative to one another, reference is made to FIG. 5 and to the use of a Cartesian coordinate system with an X, Y, Z axis located on the upper left corner of the open slot, as seen in FIG. 5, which is selected as the reference slot and designated 22R. Be definition the axes X, Y and Z of a Cartesian coordinate system are perpendicular to one another, as are the three planes XZ, YZ, and YX defined by these axes. The suffix "R" is used to distinguish the reference slot and the surfaces forming this slot from the further slots and to designate the fibers carried in the reference slot. FIGS. 3-5 show the preferred structure that is used to form two identical light transfer devices, as is described hereinafter.

The reference slot 22R related to the coordinate system in FIG. 5 has a first reference supporting surface 24R in the YZ plane for a reference end fiber 12R and a second reference surface 25R in the XZ plane for the reference end fiber 12R. These surfaces 24R and 25R locate a reference end fiber 12R along the YZ and XZ planes, respectively, and perpendicular to the YX plane.

Each additional slot 22 in body 21, then, has what is referred to as a first supporting surface 24 in the YZ plane and a second supporting surface 25 in a second plane parallel to and displaced a fixed distance from the reference second plane.

These first and second supporting surfaces locate the fibers and, when adhered to the fibers, mechanically hold the fibers against movement relative to one another in three mutually perpendicular planes, which prevents the plurality of spaced fiber ribbons from being skewed or squirreled at an angle along the lengths thereof.

A preferred method of making the above described locator body is to use a plurality of identical generally channel-shaped locator members 31 stacked one on another, as shown in FIGS. 3-6.

Each locator member 31 has a spacer portion 32 and stepped out projecting portions 33 and 34 at the opposite ends of the spacer portion, together with stepped in notched portions 43 and 54 opposite projecting portions 33 and 34, respectively. For reference purposes the spacer portion 32 has oppositely disposed surfaces 25 and 45, projecting portion 33 has surfaces 24 and 38 at right angles to one another, projecting portion 34 has surfaces 44 and 48 at right angles to one another, notched portion 43 has surfaces 36 and 37 at right angles to one another, and notched portion 54 has surfaces 46 and 47 at right angles to one another. The notched portions 43 and 54 are complementary in shape with projections 33 and 34 but are not as deep as the projections so that, when the notched portions 43 and 54 are placed on the projecting portions of another locator member 31 in a nesting or stacked relation, the spacing for slot 22 is formed. It will be noted that surfaces 24 and 37 are in the same plane and surfaces 44 and 47 are in the same plane.

Referring now to FIG. 3, the ends of each locator member are shown tapered or V-shaped, as indicated at 39, so that there are no sharp corners or right angle bends for the relatively brittle fibers.

In a preferred procedure for making the device 11 using the channel-shaped locator member as above discussed, an adhesive is placed along the inside of the channel of one member 31 and a fiber ribbon 26 is placed on the inside surfaces with the end fibers of the ribbon abutting against adjacent inside surfaces 24 and 44 to hold the ribbon in place. Preferably, the channel defined by surfaces 24 and 44 is the same width as the fiber ribbon.

The adhesive is placed on the top of the ribbon so disposed in the channel and on surfaces 48 and 38. A second locator member 31 is placed on the first with the spacer portion surfaces 37 and 47 inserting into the channel surfaces 24 and 44, respectively, the spacer portion surface 45 pressing down on the top of the fiber ribbon. Succeeding locator members 31 and fiber ribbons are stacked one on the other until the desired stack is achieved. The depth of the stack establishes the lateral extent of the body 21, as seen in FIG. 1.

The fibers 12 secured in the assembled channel-shaped locator member 31 are then cut down through the stack, as shown in FIG. 3, along a plane designated 49 that is rotated 90 degrees to the plane of the fiber ribbon or XZ plane and at a slight angle, designated A, to the rotated plane to define the end surface 13 with the cut fiber ends.

This method of making provides two identical light transfer devices 11. A sharp angle A provides greater surface area. A preferred angle A is between 8 degrees and 10 degrees to the axis of the fibers.

The opposite end portions of the fibers 12 preferably are supported in the same manner, using a locator body 51 with interior slots 52, again shown as made up of a plurality of channel-shaped locator members 61 stacked one on another in the same manner as are locator members 31 above described. These channel-shaped members preferably have the same channel width as the ribbon but decrease in thickness along their length to bring the fibers to a solid bundle having a uniform array of rows and columns at the end surface 14.

Figure 6:
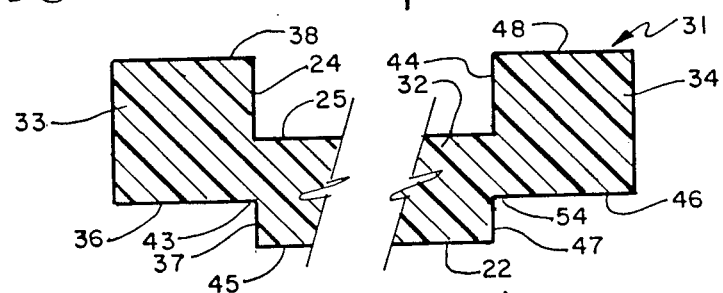
FIG. 6 is a fragmentary cross-sectional view of the locator body shown in FIG. 5.
Figure 7:
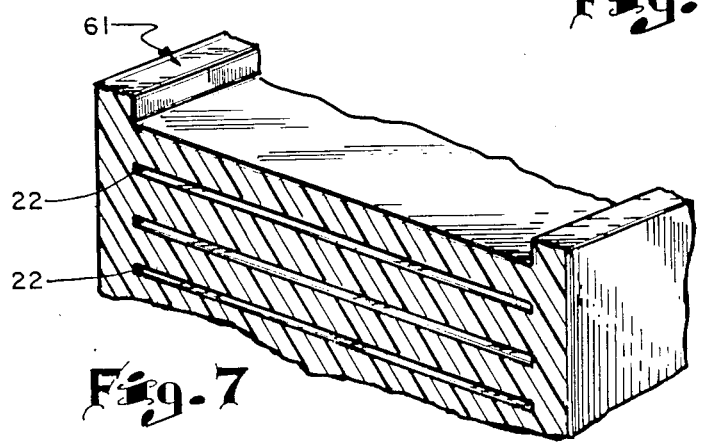
FIG. 7 is a perspective view of a portion of a solid locator body.
Figure 8:
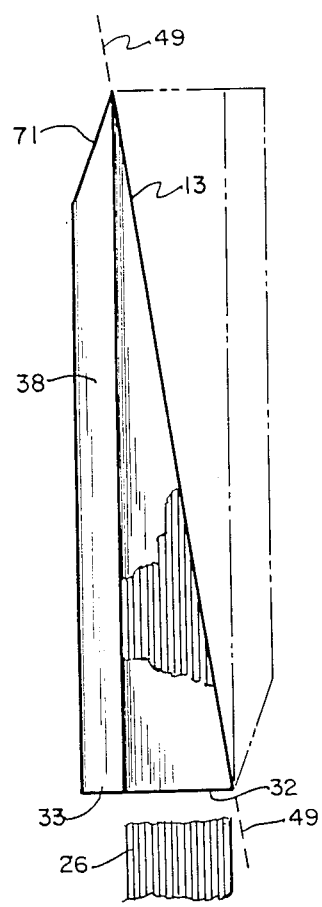
FIG. 8 is a side elevation view of the locator body with only portions of the fiber ribbon shown in place.
Figure 9:
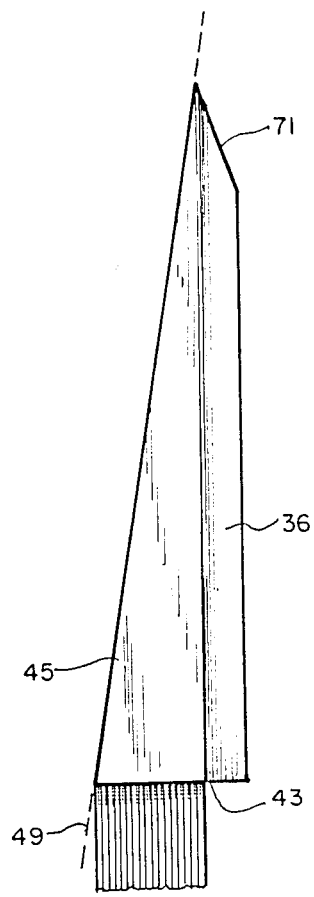
FIG. 9 is a side elevation view of the opposite side of the locator body.

An alternative to the stacked channel-shaped locator members above described would be to form a unitary rectangular block 61 and to use a cutting tool such as a laser to form the reference slot 22R and slots 22 for a ribbon of fibers, as is illustrated in FIG. 6. An adhesive would be placed on the ribbon and the ribbon of fibers would be slid through the longitudinally facing openings of the slots.

Figure 10:
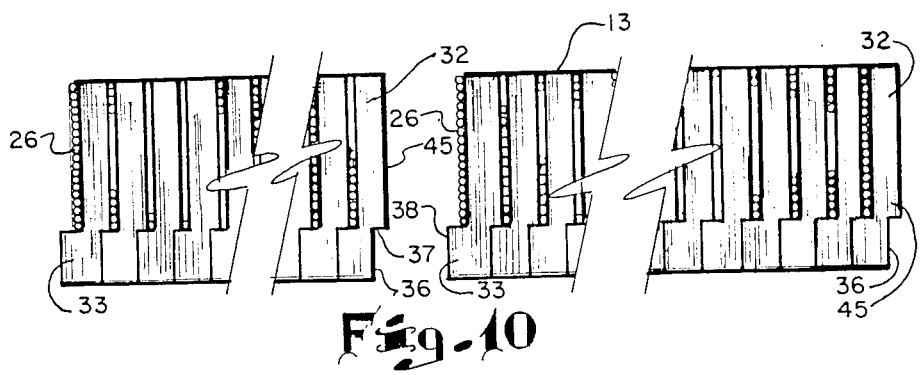
FIG. 10 is an end elevation view of the wide end of two of the image transfer devices that are separated before being brought together in a modular assembly.

The support body 21 above described is particularly suitable for being stacked side by side and end to end to enlarge the end surfaces as required. A modular assembly of two of the devices which form end surfaces 13 side by side and two more end to end is shown in FIG. 11. The two side by side are shown separated in FIG. 10 but when brought together and projecting portion 33 and ribbon portion 26 along one side mate with the notched portion 43 and surface 45 of the adjacent device to provide uniformity in the succession of the fiber ribbon 26 and spacer portion 32 between the two devices.

A pin 57 extends through alined holes in the projecting portion 33 of the bodies 21 to position these bodies and hold them side by side.

For stacking end to end, an angular cut 71 is provided along projecting section 33 at the narrow end to allow the ribbons to pass along the back side of the modular array, as shown in FIG. 12. In the end to end stacking of the devices forming end surfaces 13 the ribbons line up in straight lines and the spacer portions 32 line up in straight lines. It is noted in FIG. 11 that the end surface 13 of the device 11 in the upper right-hand corner has its end surface 14 also in the upper right-hand corner. The fibers in the end surface proceed from top to bottom, while corresponding fibers at end surface 14 proceed from bottom to top in the ribbon.

A block 65 is shown adjacent surface 14 in the modular assembly. This may be used for inputting light by a variety of means including, but not limited to, kinescopes (crt), microshutters with a light source behind, lasers, liquid crystal shutters, or similar light control mechanisms. The cut ends of the fibers may be located with a material such as phosphorus encased in a vacuum and may have either light or electron beams projected at the cut end surface. If the direction of light were to be reversed through the device 11, the block 65 would be receiving light from a source at end surface 13.

In a specific example of the construction and use of the light transfer device, the lateral extent or width of surface 13 is 8 inches and the vertical extent is 6 inches for a 4:3 width to height ratio. Each ribbon is 1 inch wide and contains 333 fibers, each of which is 0.003 inches in diameter. The center to center spacing of the ribbons is 0.018 inches. The spacer section is 0.015 inches. The matrix at the end surface 14 is 1 inch by 1.332 inches, providing a gain of 36:1. The angle of cut Z is 9.6 degrees.

A preferred fiber for this application is in the range of 3 to 100 microns in diameter and has a wavelength of 400–700 nanometers. The fiber is coated black to prevent cross-talk and has a 3 db. loss over 1000'. If the ends are coated with a phosphor, an electron beam is able to excite these ends.

Referring now to FIGS. 13–24 there is shown another embodiment of a light transfer assembly 79 which is made up of a plurality of light transfer devices 81. Each light transfer device 81 has a bundle of optical fibers F arranged as a series of spaced parallel fiber ribbons R terminating at one end in an end surface 83 herein referred to as the spaced ribbon end surface which will serve as a coherent image display screen. The fibers terminate at the other end in an end surface 84 which will serve as the image input end and is herein referred to as the matrix end surface.

The light transfer assembly 79 shown has a selected number of spaced ribbon end surfaces 83 arranged side by side in a row and a selected number of spaced ribbon end surfaces 83 arranged end to end in a column. An open multi-sided support frame 86 is shown holding the end surfaces 83 together. Similarly, there is shown a selected number of matrix end surfaces 84 arranged side by side and a selected added number of matrix end surfaces arranged end to end in a column. An open multi-sided support frame 88 is shown holding the matrix end surfaces 84 together.

A locator body 90 for locating and supporting the fiber ribbons at end surface 83 is made up of a plurality of identical halves of locator elements 120 shown in detail in FIGS. 25–28. Locator body 90 has four ear portions two of which ear portions 91 and 92 are spaced from one another along the body and extending out from the back surface thereof opposite end surface 83. Ear portion 91 is located approximately midway between the top and bottom ends of the locator body 90 as oriented for viewing as shown and ear portion 92 is adjacent the bottom end of the locator body as is shown in FIG. 15. Each ear portion is generally circular and has a hole 93 with a center extending parallel to the end surface 83. A hollow metal tube 94 extends through the hole 93. The ends of tubes 94 terminate flush with or slightly inwardly of the ends of the locator body so two can abut end to end when two bodies are positioned one against the other as seen in FIG. 18. The ear portions 92 are shown as terminating a distance of two locator elements from the end of the body to allow for a connector (not shown) which connects between the top and bottom sections of the support frame. A joint J is formed between the mating surfaces of two locator bodies 90 which are preferably secured together at the joint by a glue or adhesive. As best seen in FIGS. 16 and 18 rod 95 extends through the tubes 94 of two or more locator bodies disposed one against the other for aligning and connecting the two locator bodies in a straight row and locates the end surfaces 83 of the two bodies in substantially a common plane. This rod 95 is suitably connected at the ends to the sides of the support frame 86.

Each locator body 90 has a notch 96 along one surface and a flange 97 along an opposing parallel surface which notch and flange are complementary in shape so as to mate or interfit at joint J when two locator bodies are placed one against the other. Each locator body 90 further has a tapered pin-like projection 98 that extends out beyond the surface of the notch along with a complementary shaped tapered socket 99 in the opposite surface of flange 97 so projection 98 interfits in socket 99 at joint J.

Proceeding from top to bottom as oriented in the drawings each locator body 90 has a tapered top end portion 100, a top ridge 101 and a top groove 102 extending along the back surface for the full lateral extent thereof. Proceeding from the bottom toward the top the locator body further has a bottom ridge 104 and a bottom groove 105 and a portion of an upper bottom ridge 106 extending along the front surface adjacent the bottom for the full width thereof. When two of the locator bodies are assembled and connected end to end the top ridge 101 fits in bottom groove 105 and bottom ridge 104 fits in the top groove 102. This is essentially a snap or force-fit connection.

The tapered top end portion 100 overlaps the ridge portion 106 and the lowest fiber F forming end surface 83 of the upper locator body so that the top fiber F of the lower locator body overlaps the bottom fiber of the upper locator body to provide a substantially continuous image. This overlap of fiber ends is on the order of about 0.25 to 0.33% of the distance of the ovality of the perpendicular distance of the face of an individual fiber F.

Referring now to FIG. 23, the fiber ribbons R as viewed looking toward the matrix end surface 84 are disposed in parallel spaced vertical columns with a separator 113 in the form of a thin sheet disposed along the terminating left side and between each ribbon column with no separator on the terminating right side of the matrix body. The separator 113 extends a short distance along the fibers to approximately line 119 in FIG. 15 and functions to dispose the fiber ribbons R in substantially parallel planes and keeps the plane of the external surfaces of one fiber ribbon separated from and substantially parallel to the plane of the external surfaces of the next fiber ribbon. The separators are relatively thin in relation to the diameter of the fiber and should be on the order of 1/40 of the thickness of a diameter of the fiber. A typical thickness for the separator is 0.0005 inches for fibers of a diameter of 0.02 inches. Although the ideal is to have the centers of each ribbon parallel and the exterior surfaces in each ribbon in parallel planes, FIG. 24 illustrates a slight deviation and deformation in the separation as at D but the separator is useful in preventing significant deviation between sucessive ribbons. A light reflective glue or adhesive 114 bonds the separators to the ribbons to form an integral matrix body of alternating ribbons and separators in a closely packed relationship. This integral matrix body is formed in a U-shaped former described in an application of the same inventor filed concurrently herewith entitled METHOD AND APPARATUS FOR MAKING LIGHT TRANSFER DEVICES.

A series of alternating top ridges 115 and top grooves 116 extending laterally across the top of the end portion of the fiber ribbons which form end surface 84. These ridges and grooves alternate in a direction away from the end surface 84 along the fiber ribbons. A similarly shaped series of alternating bottom ridges 117 and bottom grooves 118 extend laterally across the bottom of the end portion of the fiber ribbons which form end surface 84. These ridges preferably are formed of the glue which bonds the separators 113 and fiber ribbons F together. As seen in FIGS. 21 and 22 the top ridge 115 of the bottom end portion fits in the bottom groove 118 of the top end portion and the bottom ridge 117 fits in top groove 116. The top ridges and top grooves of two end portions arranged side by side align with one another which is used in the support frame 88 for maintaining the fiber ribbons in precise spaced columns. Preferably the thickness of these ridges 115 and 117 is about one fourth the diameter of the fiber F so that when they are butted together they equal one-half the diameter of the fiber F.

A preferred embodiment of a locator element 120 used in making the above described locator body 90 is shown in detail in FIGS. 25 to 27. The locator element is made as a one-piece or unitary body preferably by injection molding. The element has an intermediate spacer portion 121 that is substantially uniform in thickness and has a smooth first surface 122 on which one face of the fiber ribbon R is disposed and a second surface 123 opposite the first surface 122 provided with a series of relatively shallow equally spaced parallel grooves 124 extending laterally of the element which strengthen the element and prevent warping during the molding process. These grooves 124 also fill with glue during the assembly process. A pair of spaced parallel flanges 97 project out from opposite ends of the spacer portion which provide a pair of spaced parallel support surfaces 125 for confining and supporting the ends of a fiber ribbon R disposed on surface 122. A notch 96 is provided in each flange defined by a pair of spaced parallel surfaces 127 in the same plane as surfaces 125 so that when one locator element is nested in another a slot S (FIG. 18) is formed between surfaces 123 and 122 and both surfaces 125 to accomodate a fiber ribbon therein.

The locator element 120 has a plurality of spaced holes 126 in each flange 97 and a pair of holes 129 in each ear portion to maintain a substantially uniform mass laterally of the element to prevent warping during the molding process. The element further has an ear portion 91 projecting out from the side of each flange which are located approximately between the ends of the element and an ear portion 92 projecting out from each flange adjacent one end thereof. These ear portions having the hole 93 with its center parallel to surfaces 125 are adapted to receive the hollow metal tubes 94 during the forming process for the locator body as above described.

The locator element 120 has along opposite and adjacent sides an ear portion 131 between the ear portions 91 and 92 and another ear portion 133 disposed along the flange a distance from the ear portion 91. Ear portions 91, 92, 131 and 133 are of a corresponding size and shape. Ear portions 131 and 133 are engaged by support pins in the forming process and the two sets of ear portions are used in a holding jig during the cutting of the formed locator body into two identical parts along a diagonal line 128 which divides the locator elements into two identical half-elements.

There is further provided a lateral projection 135 as seen in FIG. 25 at each end laterally opposite the end ear portion 92 that slides into a channel in a support post of the spaced ribbon former. This lateral projection is provided by removing part of the flange 97. The lateral projection 135 has projection 136 and socket 137 similar to projection 98 and socket 99 which serve to guide the elements in place during assembly but which is cut away and removed during the cutting process when the locator bodies are cut into two identical parts described formed thereon. The bottom ridge 104 and bottom groove 105 and ridge 106 are formed in the flange adjacent projection 135. The opposite end is shown to have the end portion 100, top ridge 101 and top groove 102 which is provided by removing a portion of flange 97.

After the glue is applied to each of the locator elements they are successively positioned in a spaced ribbon former between ribbon layers to provide a ribbon in each slot. The assembly is clamped and cured in an oven. Each formed locator body is cut along a diagonal line 128 to make two locator bodies and terminate the fibers to form the end surface 83.

Each locator element 120 preferably is made of a polysulfone consisting of carbon fibers and glass beads. This body is black in color to absorb ambient light (non-reflective) and has no glare. The shrinkage is low and very predictable.

In the light transfer device 81 an example device has a width on the end surface 83 of 6 inches and the vertical extent 6 inches. Each fiber ribbon F is 1 inch wide and contains 50 fibers each having a diameter of 0.02 inches. The spacer portion is 0.10 inches and the angle of cut for the end surface 83 relative to the axis of the fiber is about 9.6 degrees. The matrix end surface is 1 inch by 1 inch. This provides an image gain of 36 to 1. The length of the fiber bundles typically is 142 inches. A typical assembly has four devices side by side and three in a columnar arrangement to give a 4:3 width to height ratio.

A preferred fiber for this application is in the range of 3 to 100 microns in diameter and has a wavelength of 400-700 nanometers. The fiber is coated to prevent cross-talk and is not necessarily black, but can also be coated white.

The glue used is an epoxy that is white in color, reflective to visible light, has a hardness of 80-90 durometers, and has a relatively high impact resistance.

Although the present invention has been described with a certain degree of particularity, it is understood that the present disclosure has been made by way of example and that changes in details of structure may be made without departing from the spirit thereof.

What is claimed is:

1. A fiber optic light transfer device comprising:
   a bundle of optical fibers arranged as a series of spaced, parallel fiber ribbons, said ribbons terminating at one end in a first end surface and at the other end in a second end surface,
   a locator body for locating and supporting the fibers forming said first end surface in relation to one another, said body having a series of spaced parallel slots therein, each said slot being defined by a first support surface against which an end fiber of a ribbon is positioned and a second support surface perpendicular to said first support surface against which a face of an associated ribbon is positioned and a third support surface opposite said first support surface and parallel thereto, each said ribbon being secured to at least said first and second support surfaces to hold said fibers against movement relative to one another in relation to three mutually perpendicular planes, said locator body having an ear portion projecting out from and extending along a surface opposite said first end surface, said ear portion having a hole with a center arranged parallel to said first end surface for receiving means for aligning and connecting two similar locator bodies side by side in a row with the associated first end surfaces being disposed in substantially the same plane.

2. A device as set forth in claim 1 wherein there are two of said ear portions, one of said ear portions being disposed about midway between the ends of said body and the other being disposed adjacent one end of said body.

3. A device as set forth in claim 1 including a hollow metal tube extending through said holes in said ear portions through which said straight rod extends.

4. A device as set forth in claim 1 wherein said locator body is made up of a plurality of locator elements positioned one against the other and secured together with an adhesive, each said locator element being made of a polysulfone that is black in color and has no glare.

5. A device as set forth in claim 1 wherein each locator body has a notch along one side surface and a flange complementary in shape to said notch along an opposite side surface, said notch and flange having flat mating surfaces interfitting at a joint when two of said locator bodies are disposed side by side in a row.

6. A device as set forth in claim 1 said locator body has a pin-like projection extending along one side surface and a socket complementary in shape to said projection along an opposite side surface, said projection and socket interfitting at a joint when two of said locator bodies are disposed side by side.

7. A device as set forth in claim 1 wherein each fiber ribbon is about one inch wide and contains 50 fibers each having a diameter of about 0.02 inches and said ribbons are spaced apart about 0.10 inches.

8. A device as set forth in claim 1 wherein each locator body has a first groove and first ridge extending along a surface opposite said first end surface adjacent one end of said body and a second groove and second ridge extending along a surface opposite said first surface at the opposite end of said body so that said first groove and first ridge interfit with a second ridge and a second groove in a second similar locator body positioned end to end to form a joint between two of said locator bodies disposed end to end in a columnar arrangement.

9. A device as set forth in claim 8 wherein said locator body has an end portion extending beyond said first ridge that overlaps a portion of the locator body inwardly of said second groove and ridge of two connected bodies so that the ends of adjacent fibers of the two connected bodies overlap one another.

10. A fiber optic light transfer device comprising:
    a bundle of optical fibers arranged as a series of spaced, parallel fiber ribbons, said ribbons terminating at one end in a first end surface and at the other end in a second end surface, each ribbon being made up of a plurality of optical fibers arranged side by side,
    a locator body for locating and supporting the fibers forming said first end surface in relation to one another, said body having a series of spaced parallel slots therein, each said slot being defined by a first support surface against which an end fiber of a ribbon is positioned and a second support surface perpendicular to said first support surface against which a face of an associated ribbon is positioned, each said ribbon being secured to said first and second support surfaces to hold said fibers against movement relative to one another in relation to three mutually perpendicular planes, and
    a separator in the form of a relatively thin deformable sheet disposed between each ribbon for disposing the fibers forming said second end surface in substantially parallel planes with each separator generally conforming to the external shape of the adjacent optical fiber against which the separtor is pressed, each separator generally preventing the optical fibers of one ribbon passing down between the optical fibers of the adjacent ribbon, each said ribbon being secured to the adjacent separator to form an integral matrix body of alternating ribbons and separators in a closely packed relationship.

11. A device as set forth in claim 10 wherein a reflective glue interconnects said separators and columns of ribbons in forming said matrix body.

12. A device as set forth in claim 1 wherein said matrix body has a series of first ridges and first grooves extending along opposite faces of the fiber ribbons, said ridges and grooves alternating in the direction along said ribbons so that said first groove and first ridges interfit with similar grooves and ridges of a similar matrix body positioned in a columnar arrangement and ridges align with ridges and grooves align with grooves of a similar matrix body positioned side by side in a row.

13. A device as set forth in claim 10 wherein said matrix body is about 1 inch by 1 inch.

14. A device as set forth in claim 10 wherein each fiber has a diameter of about 0.02 inches and each separator has a thickness of about 0.0005 inches.

15. A fiber optic light transfer device comprising:
a bundle of optical fibers arranged as a series of spaced, parallel fiber ribbons, said ribbons terminating at one end in a first end surface and at the other end in a second end surface,
a locator body for locating and supporting the fibers forming said first end surface in relation to one another, said body having a series of spaced parallel slots therein, each said slot being defined by a first support surface against which an end fiber of a ribbon is positioned and a second support surface perpendicular to said first support surface against which a face of an associated ribbon is positioned and a third support surface opposite said first support surface and parallel thereto, each said ribbon being secured to at least said first and second support surfaces to hold said fibers against movement relative to one another in relation to three mutually perpendicular planes, each said locator body having a pair of spaced ear portions projecting out from and extending along a surface opposite said first end surface, each said ear portion having a hole with a center arranged parallel to said first end surface for receiving a straight rigid rod for aligning and connecting two similar locator bodies side by side in a row with the associated first end surfaces being disposed in substantially the same plane, each said locator body having a first groove and first ridge extending along a first surface opposite said first end surface adjacent one end of said body and a second groove and second ridge extending along a second surface opposite said first surface at the opposite end of said body so that said first groove and first ridge interfit with a second ridge and a second groove in a second similar locator body positioned end to end to form a joint between two of said locator bodies disposed end to end in a columnar arrangement, and
a separator disposed between each ribbon for disposing the fibers forming said second end surface substantially parallel planes, each said ribbon being secured to the adjacent separator to form an integral matrix body of alternating ribbons and separators in a closely packed relationship, said matrix body having a series of first ridges and first grooves extending along opposite faces of the fiber ribbons, said ridges and grooves alternating in the direction along said ribbons so that said first groove and first ridges interfit with similar grooves and ridges of a similar matrix body positioned in a columnar arrangement and ridges align with ridges and grooves align with grooves of a similar matrix body positioned side by side in a row.

16. A fiber optic light transfer assembly comprising:
a plurality of fiber optic light transfer devices, each said device having a bundle of optical fibers arranged as a series of spaced, parallel fiber ribbons, said ribbons terminating at one end in a first end surface and at the other end in a second end surface, and a locator body for locating and supporting the fibers forming said first end surface in relation to one another, said body having a series of spaced parallel slots therein, each said slot being defined by a first support surface against which an end fiber of a ribbon is positioned and a second support surface perpendicular to said first support surface against which a face of an associated ribbon is positioned, each said ribbon being secured to at least said first and second support surfaces to hold said fibers against movement relative to one another in relation to three mutually perpendicular planes, and a separator disposed between each ribbon for disposing the fibers forming said second end surface substantially parallel planes, each said ribbon being secured to the adjacent separator to form an integral matrix body of alternating ribbons and separators in a closely packed relationship,
said first end surfaces of said devices being connected side by side and end to end in a first support frame,
said second end surfaces of said devices being connected side by side and end to end in a second support frame.

17. An assembly as set forth in claim 16 wherein each locator body of each device arranged side by side is connected together along the back by a straight rod that extends through an ear portion projecting out from the back of each locator body.

18. An assembly as set forth in claim 16 wherein each locator body has matching mating surfaces along the front and rear surfaces to interconnect end to end.

19. An assembly as set forth in claim 18 wherein an end portion of a lower locator body overlaps the lower end portion of an upper locator body.

20. An assembly as set forth in claim 18 wherein the fiber ends of said overlapping locator bodies overlap on the order of about 0.25 to 0.33% of the distance of the ovality of the perpendicular distance of the face of individual end fibers.

21. An assembly as set forth in claim 16 wherein there are four devices side by side and three devices in a columnar arrangement to give a 4:3 width to height ratio.

22. A locator body element for use in making a fiber optic light transfer device comprising:
an element having an intermediate spacer portion and a pair of flanges at the opposite ends of said spacer portion, a notch in each flange so that when one element is positioned against another element the flange of one nests in the notch of the other and a slot is formed between adjacent spacer portions,
first and second ear portions projecting out from each flange in spaced relation to one another, each said ear portion having a hole for receiving a hollow tube to align and connect in alignment a plurality of said elements positioned one against the other, third and fourth ear portions projecting laterally out from each flange, each said ear portion having a hole to be supported by pins in a cutting fixture for cutting a locator body formed by a plurality of said elements positioned one against the other into two identical half bodies, a first ridge and first groove extending along one side of said element at one end and a second ridge and second groove extending along the other side of said element at the opposite end said first ridge and second groove and first groove and second ridge being complementary in shape for interfitting when two of said elements are arranged end to end and overlapped, a pin-like projection extending out from each flange into the notch at the end of each element, and a socket of a shape complementary to said projection on the opposite side of the flange so that the projection of one element fits into the socket of a similar element against which it is positioned when two locator bodies are positioned one against the other.

23. A locator body element as set forth in claim 22 wherein said element is made of an injection molded polysulfone.

24. A locator body element as set forth in claim 22 wherein each flange has a series of holes to maintain a substantially uniform mass laterally of the element to prevent warping during the molding process.

25. A locator body element as set forth in claim 22 wherein said spacer portion has a smooth support surface on which a fiber ribbon is positioned and an opposite surface with a series of relatively shallow parallel spaced grooves which strengthen the element and prevent warping during the molding process.

* * * * *